United States Patent
Frickey

(10) Patent No.: US 6,175,423 B1
(45) Date of Patent: Jan. 16, 2001

(54) IMAGE FORMING SYSTEM FOR ARRANGING PLURALITY OF IMAGES ON A DISK PLAY MEDIUM

(75) Inventor: Steven J. Frickey, Meridian, ID (US)

(73) Assignee: Hewlett-Packard Company, Palo Alto, CA (US)

(*) Notice: Under 35 U.S.C. 154(b), the term of this patent shall be extended for 0 days.

(21) Appl. No.: 09/030,636

(22) Filed: Feb. 25, 1998

(51) Int. Cl.$^7$ ............................................. G01S 13/00
(52) U.S. Cl. ........................ 358/1.2; 358/1.19; 358/1.18; 364/5.19; 364/900
(58) Field of Search ...................... 358/1.2, 1.18, 358/1.19; 364/519, 900

(56) References Cited

U.S. PATENT DOCUMENTS

| | | | |
|---|---|---|---|
| 4,928,252 | * 5/1990 | Gabbee et al. | 364/519 |
| 5,557,728 | * 9/1996 | Garrett et al. | 395/157 |
| 5,685,002 | 11/1997 | Sano . | |

* cited by examiner

Primary Examiner—Edward L. Coles
Assistant Examiner—Twyler Lamb
(74) Attorney, Agent, or Firm—Matthew L. Wade

(57) ABSTRACT

Image forming system for arranging a plurality of images onto a selected display medium. The image forming system provides capability to determine an optimized layout pattern for one or more sub-pages on a designated print medium. This system may be used to provide expanded N-UP printing capability.

11 Claims, 8 Drawing Sheets

IMAGE FORMING SYSTEM FOR ARRANGING PLURALITY OF IMAGES ON A DISK PLAY MEDIUM

FIELD OF THE INVENTION

This invention relates in general to an image forming system and more particularly to an image forming system for arranging a plurality of images onto a selected display medium.

BACKGROUND OF THE INVENTION

One of the most important aspects of a modern computer is the ability to create, visually display, store and print documents containing textual or graphical information. In order to print a document, some sort of printing device (printer) under the control of the computer is used to generate a permanent image of the document on a designated print medium.

To print a document that is, for example, stored in the random access memory (RAM) of the computer several actions must usually take place. First, since the designated print medium generally has a fixed size, the printable information contained in the document may need to be divided into sections suitable to fit onto the print medium, a process which is called pagination.

Pagination is generally performed by a computer under the direction of one or more software programs. In addition, pagination is accomplished with information regarding various dimensional parameters that pertain both to the document and to the selected print medium. As mentioned previously, as a result of pagination the document is divided into sections suitable to fit onto the selected print medium. For purposes of this discussion, these sections are referred to herein as "logical pages". The phrase "soft logical page" is used to refer specifically to the logical page as represented by software.

After the soft logical pages are created they may then be transmitted to the printer in the form of a print job for printing. In addition to containing soft logical pages, the print job may also include various printer control commands. One type of printer control command directs the printer to perform "N-UP printing". The letter "N" represents the number of logical pages that are to be scaled (if necessary) and printed onto a designated print medium. For purposes of this discussion a logical page that has been scaled for N-UP printing is referred to herein as a "sub-page".

Prior systems for achieving N-UP printing are limited to a pre-specified number of sub-pages that may be printed onto any one print medium. For example, a typical laser printer is limited to 2, 4 and 9-UP printing. In addition, prior printers do not optimize the orientation or scale factor of sub-pages on the print medium. This can result in an inefficient use of the printable area of the print medium.

As a result, there is a need for N-Up printing that is not limited to a pre-specified number of sub-pages. In addition, there is a need for N-Up printing wherein the sub-pages are optimally arranged on a print medium.

SUMMARY OF THE INVENTION

The present invention satisfies both these needs. According to the principles of the present invention, an aspect ratio is first calculated for one of the logical pages. After obtaining the aspect ratio of the first logical page, division factors are then calculated. The division factors are based on the value of N and are used to determine possible grid cell patterns for the designated print medium. Test aspect ratios are then calculated for each grid cell pattern. The grid cell patterns are then compared by determining the test aspect ratio having a value that is closest to the aspect ratio of the first logical page. This identifies both the grid cell pattern that is to be used for N-UP printing and an optimized orientation of sub-pages on the designated print medium.

Other objects, advantages, and capabilities of the present invention will become more apparent as the description proceeds.

DETAILED DESCRIPTION OF THE INVENTION

In general, the present invention provides the capability for determining an optimized layout pattern of images onto a selected display medium. The phrase "display medium" is used in the present description and in the claims to refer to either to a computer display device or a print medium. Although the embodiments of the present invention described below are for use by a printer for achieving improved N-UP printing, it should be distinctly understood that various alternatives and modifications are contemplated. For example, someone skilled in the art could also use the present invention for determining an optimized layout pattern of images onto a computer display device.

Figure 1:
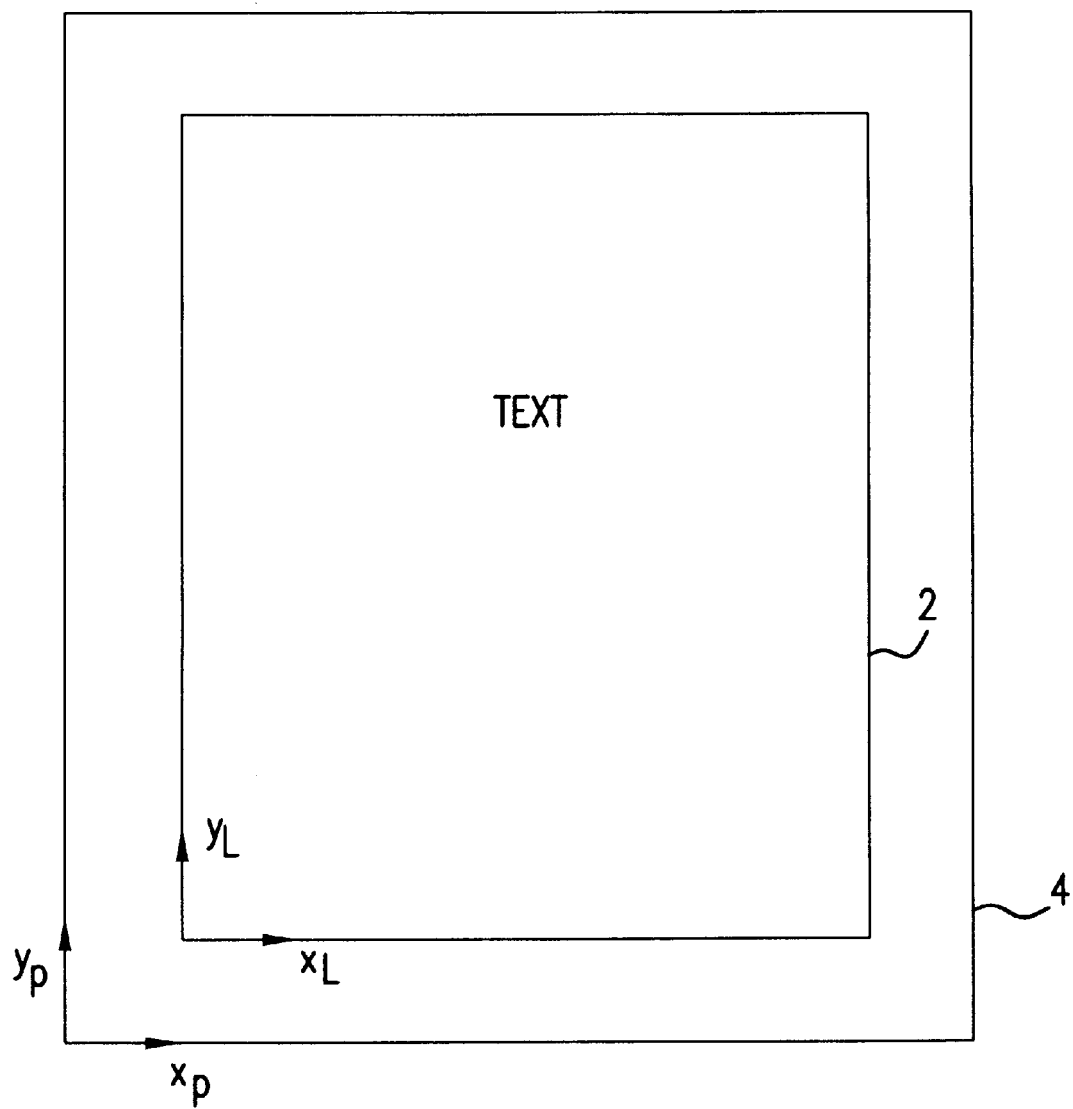
FIG. 1 is an abstract diagram of a logical page and a physical page illustrating a logical coordinate system and a physical coordinate system.

The phrase "logical coordinate system" is used herein to refer to the local coordinate system of either a logical page or a sub-page. The phrase "physical coordinate system" is used herein to refer to the local coordinate system of a print medium. FIG. 1 illustrates both a logical coordinate system for a logical page 2 and a physical coordinate system for a print medium 4 according to a coordinate system convention that will be followed throughout the following discussion. It is noted that this convention is arbitrary and in no way limits the present invention. As shown in FIG. 1, logical page 2 is in a portrait orientation with respect to print medium 4. With reference to this orientation, the logical coordinate system is defined herein to be located at the lower left hand corner of the logical page. The $X_L$-axis of the logical coordinate system (logical X-axis) is in the horizontal direction and is positive to the right. The $Y_L$-axis of the logical coordinate system (logical Y-axis) is in the vertical direction and is positive in the upward direction. In addition, the physical coordinate system is located in the lower left-hand corner of the print medium. Similar to the logical coordinate system, the $X_P$-axis of the print medium (physical X-axis) is in the horizontal direction and is positive to the right. The $Y_P$-axis of the print medium (physical Y-axis) is in the vertical direction and is positive in the upward direction.

For purposes of this discussion, the phrase "grid cell pattern" is used to refer to a possible layout pattern for sub-pages on a designated print medium. Each grid cell represents an allocated space on the print medium for the printing of a single sub-page.

Figure 2A:
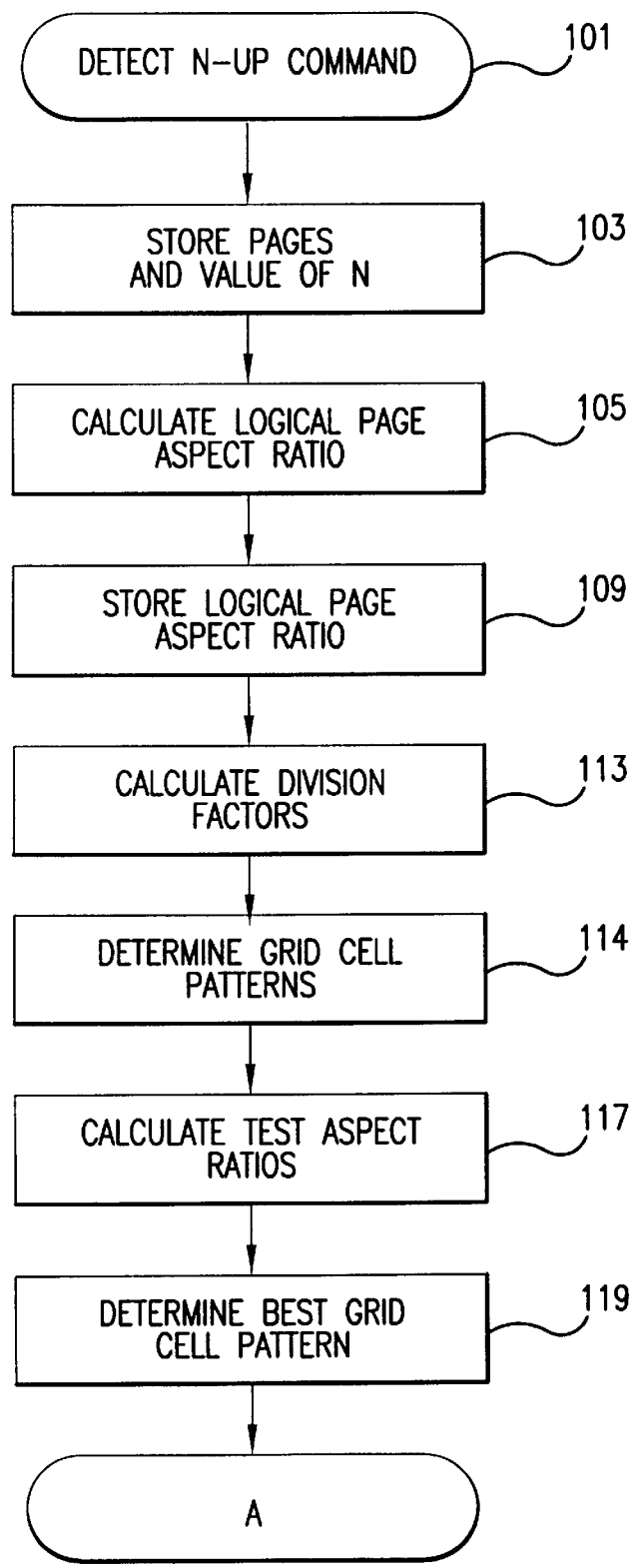
FIG. 2A and FIG. 2B is a flow chart depicting the first exemplary embodiment of the present invention.
Figure 2B:
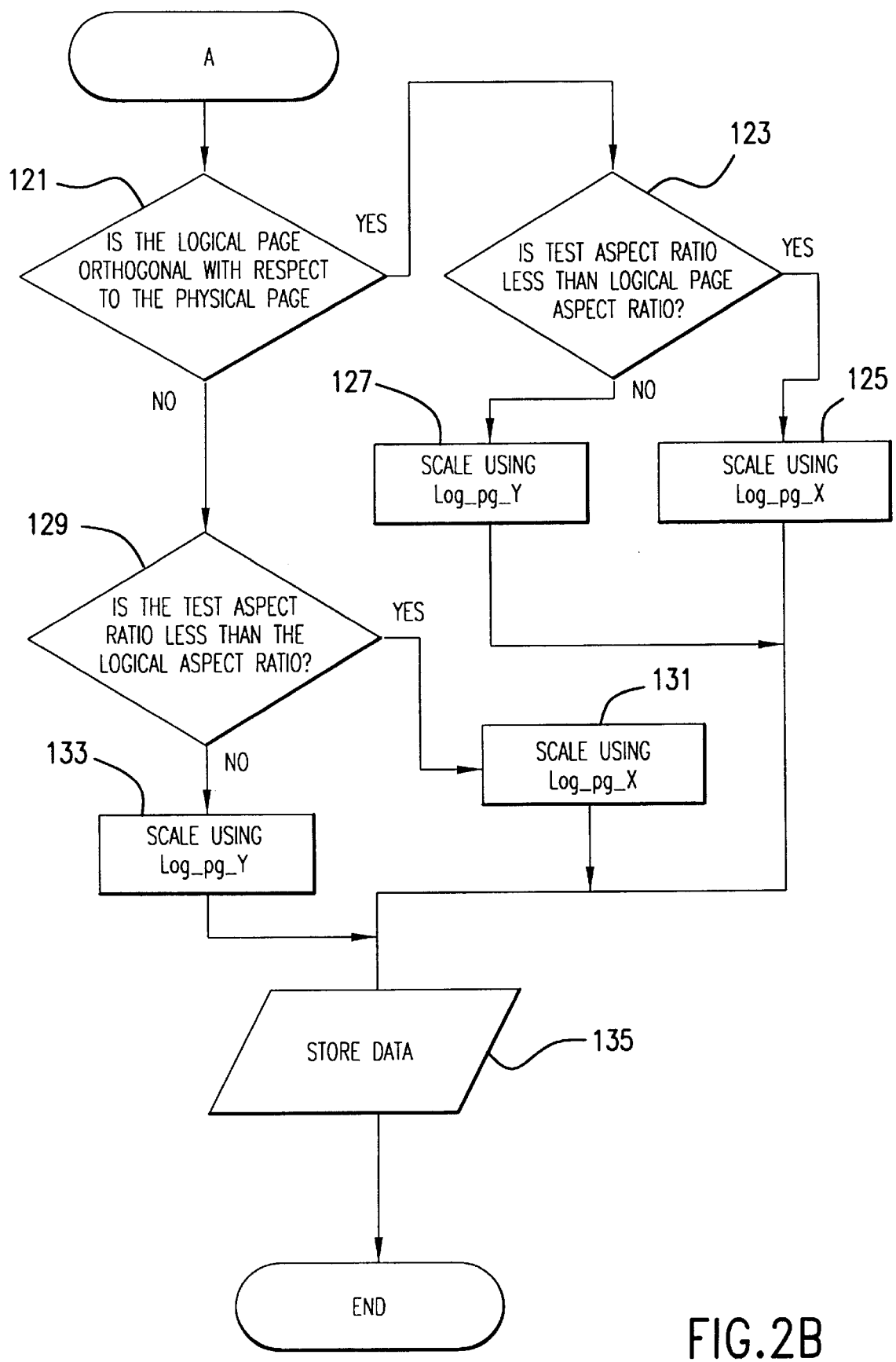

Referring now to FIG. 2A and FIG. 2B, a flow chart depicts the first exemplary embodiment of the present invention. This first embodiment is described as being performed by a printer. However, it is noted that this method could also be adapted for use by other devices such as a host computer or a print server. The method begins by the detection of a print job having an N-UP print command by a printer as depicted by box 101. After detecting the N-UP print command, the logical page information and the value of N are stored into printer memory as depicted by box 103. The aspect ratio of the first logical page detected in the print job (first logical page) is then calculated as depicted by box 105 by using the following equation:

Log_Pg_Ratio=(Log_Pg_X)/(Log_Pg_Y)

Where "Log_Pg_Ratio" is the aspect ratio of the first logical page detected in the print job. "Log_Pg_X" is the length along the logical X-axis of the first logical page. Similarly, "Log_Pg_Y" is the length along the logical Y-Axis of the first logical page. The value of the aspect ratio of the first logical page is then stored as depicted by box 109.

After obtaining the aspect ratio of the first logical page, print medium division factors (division factors) are then calculated as depicted by box 113. As discussed in more detail below, these division factors are used to determine possible grid cell patterns for N-UP printing. In this embodiment, the division factors are determined by calculating a single pair of integers that are closest to the square root of N and whose product is greater than or equal to N. A set of equations for accomplishing this task are:

a=integer value of the square root of N b_init=integer value of (N/a)

if (N−(a×b_init)>0) then b=b_init+1 else b=b_init

Where "a" is referred to herein as the first division factor and "b" is referred to herein as the second division factor. These two division factors are referred to collectively herein as "primary division factors". These factors guarantee that there will be at least "N" number of cells on a page.

As mentioned previously, the division factors are used to determine grid cell patterns for the designated print medium. Assuming the sides of the printable area of the print medium are not equal, two different grid cell patterns are determined from the primary division factors calculated from step 113. The first grid cell pattern (first pattern) is determined by dividing the length of the printable area of the designated print medium that is parallel to the physical X-axis (printable width) by division factor "a" and by dividing the length of the printable area that is parallel to the physical Y-axis (printable length) by "b". The second grid cell pattern (second pattern) is generated by dividing the printable width by division factor b and by dividing the printable length by division factor a. This step is depicted by box 114.

Figure 3A:
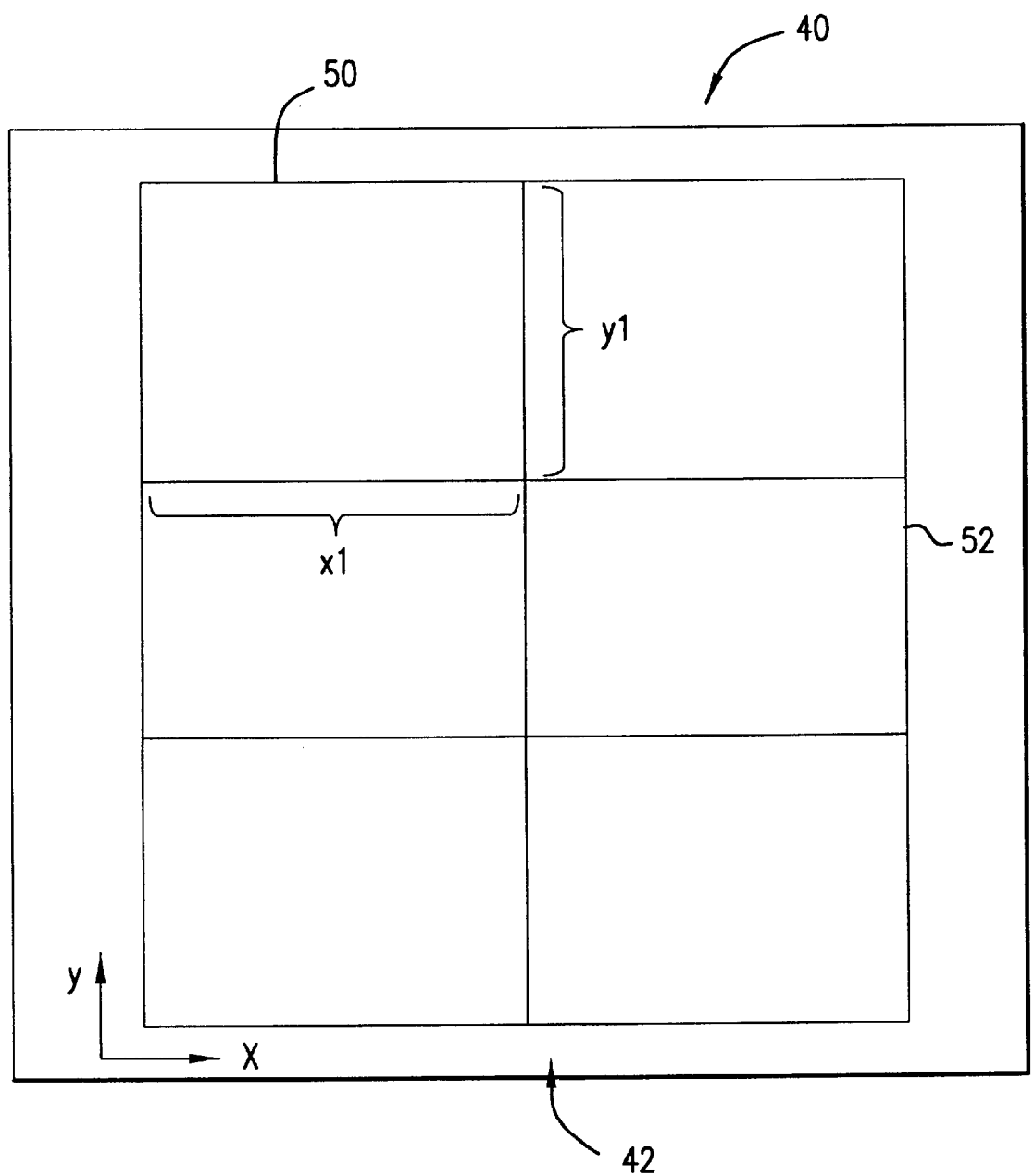
FIG. 3A is a drawing illustrating a first grid cell pattern that corresponds to division factors for 6-UP printing.
Figure 3B:
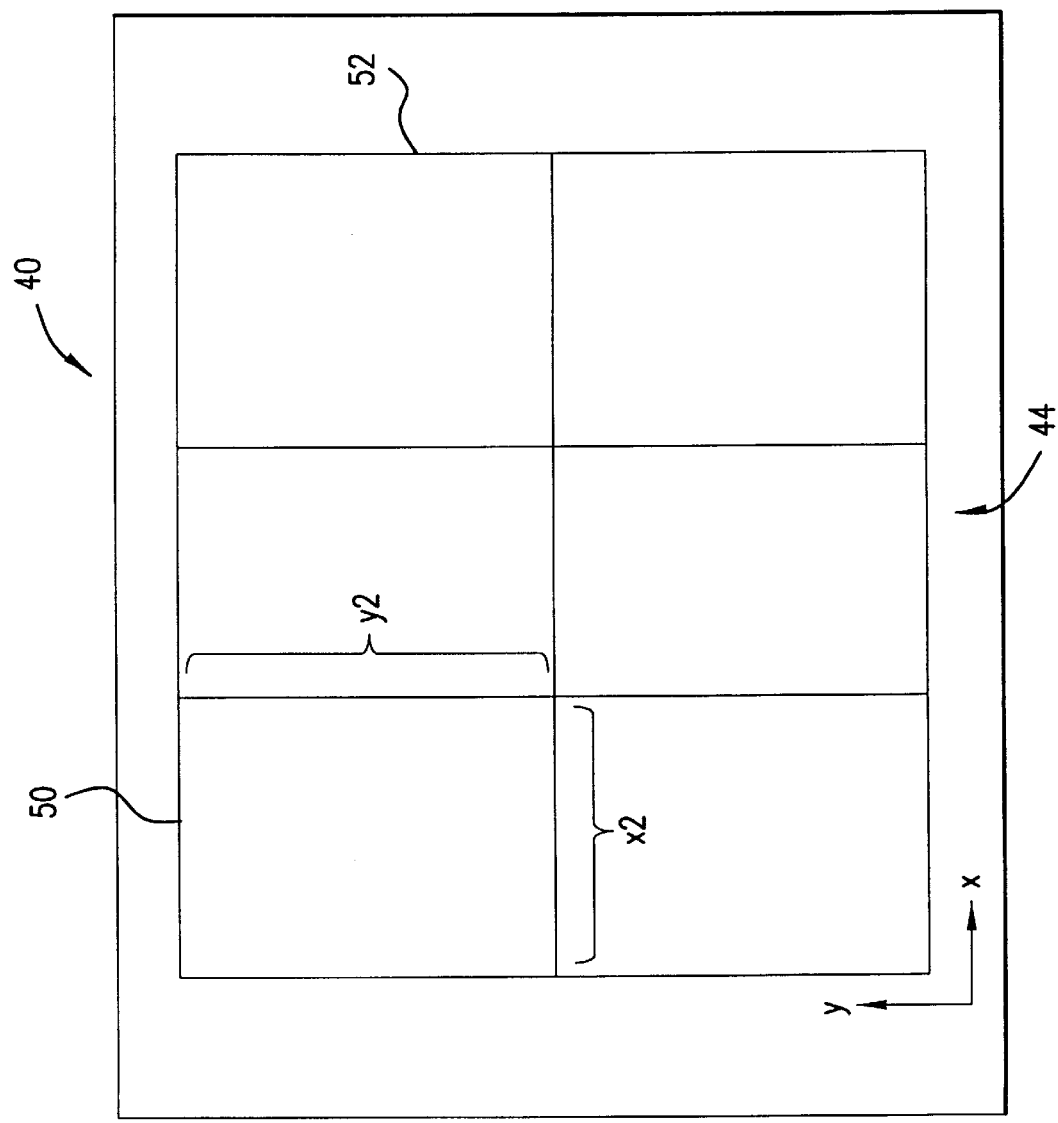
FIG. 3B is a drawing illustrating a second grid cell pattern that corresponds to division factors for 6-UP printing.

To illustrate this last step, FIG. 3A and FIG. 3B depicts a first pattern 42 and a second pattern 44 corresponding to 6-UP printing. First side 50 represents the printable width of print medium 40. Second side 52 represents the printable length of print medium 40. Using the equations described above, the division factors for 6-UP printing are a=2 and b=3. First pattern 42 is therefore determined by dividing first side 50 by 2 (i.e., the first division factor, a) and by dividing second side 52 by 3 (i.e., the second division factor, b). Second pattern 44 is determined by dividing first side 50 by 3 (i.e., the second division factor, b) and by dividing second side 52 by 2 (i.e., the first division factor, a).

It is noted that the grid cell patterns determined by step 114 results in grid cells for each grid cell pattern that are dimensionally uniform. For example, each of the grid cells that comprise first pattern 42 has dimensions of X1 and Y1. Likewise, each of the grid cells that comprise second pattern 44 has dimensions of X2 and Y2.

Figure 4A:
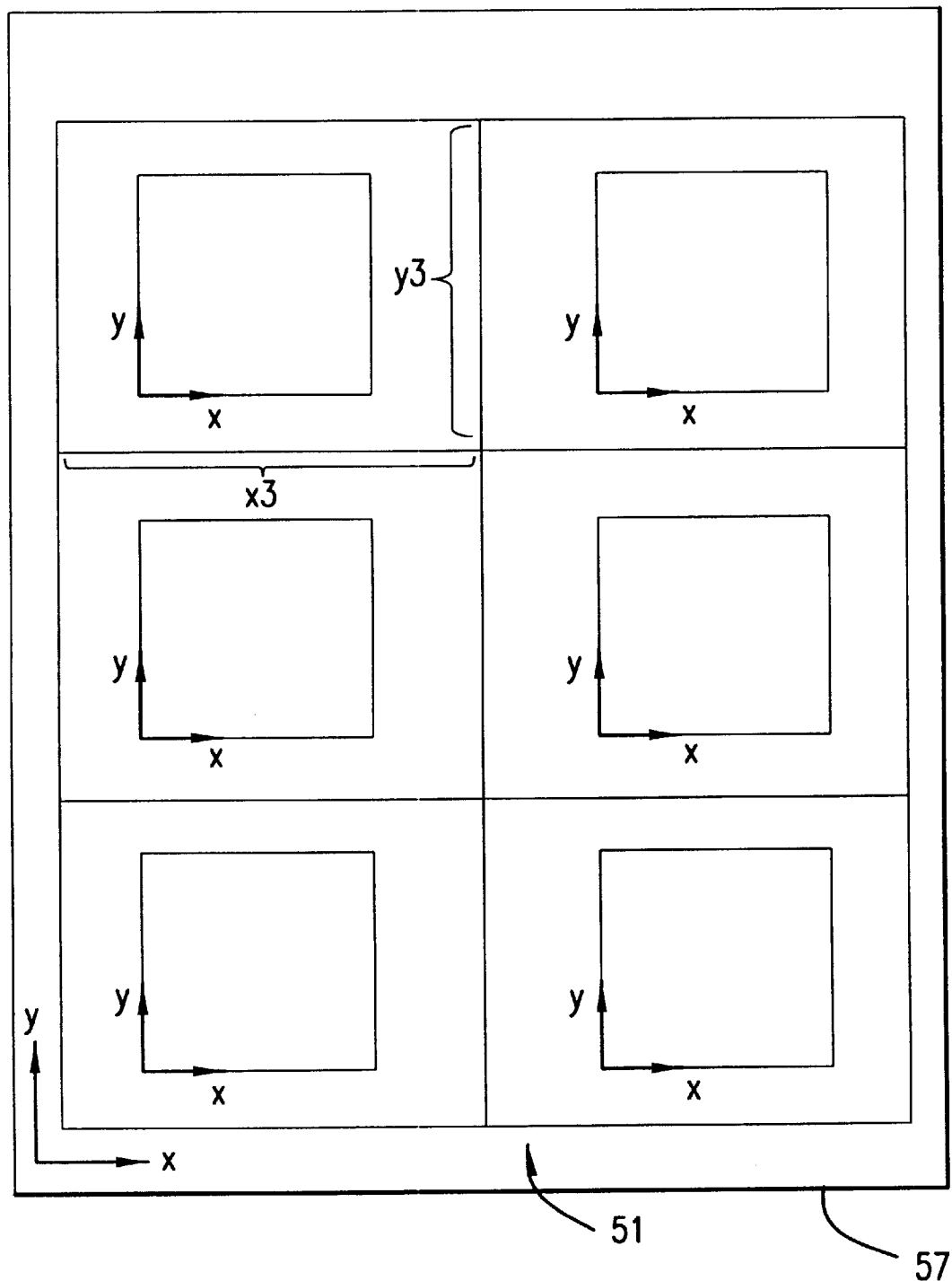
FIG. 4A is a drawing depicting a grid cell pattern with a group of sub-pages oriented normally.

It is also noted that in this embodiment a sub-page may be oriented either "normally" or "orthogonally" on a print medium. For purposes of this discussion, a sub-page is oriented "normally" if the logical X-axis is parallel and in the same direction as the physical X-axis of the designated print medium. To illustrate, FIG. 4A depicts a grid cell pattern 51 (corresponding to 6-UP printing) with a group of sub-pages oriented normally on print medium 57.

Figure 4B:
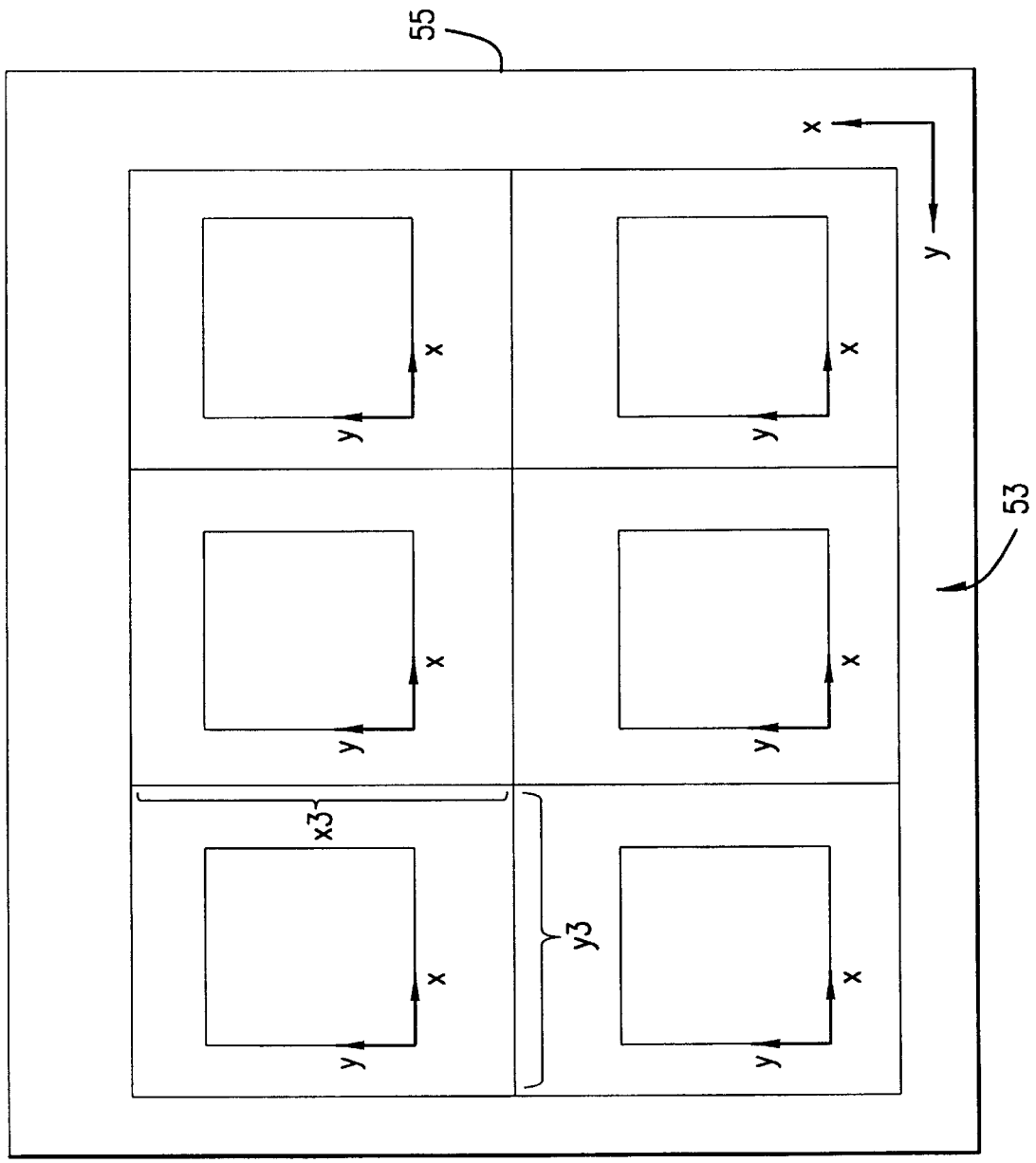
FIG. 4B is a drawing depicting a grid cell pattern with a group of sub-pages oriented orthogonally.

A sub-page is oriented "orthogonally" within a grid cell if the logical X-axis of the sub-page is parallel to the physical Y axis of the designated print medium. To illustrate, FIG. 4B depicts a grid cell pattern 53 (also corresponding to 6-UP printing) with a group of sub-pages oriented orthogonally on print medium 55.

Referring again to FIG. 2A and FIG. 2B, the next step in the present method is to determine which of the two grid cell patterns (i.e., first pattern or second pattern) provide an optimized layout pattern of sub-pages onto the designated print medium. This task is accomplished by calculating "test aspect ratios" for a characteristic grid cell corresponding to each of the two grid cell patterns. The "test aspect ratio" of a grid cell is defined herein with reference to a sub-page printed within the cell. With a sub-page oriented normally, the test aspect ratio is the length of the grid cell along the physical X-axis of the print medium divided by the length of the grid cell along the physical Y-axis. With a sub-page oriented orthogonally, the test aspect ratio is the length of the grid cell along the physical Y-axis of the print medium divided by the length of the grid cell along the physical X-axis.

Because a sub-page may be oriented either normally or orthogonally within a grid cell, two test aspect ratios are calculated for each grid cell pattern determined from step 114.

To further illustrate the meaning of test aspect ratios, attention is again directed to FIG. 4A. The two test aspect ratios for grid cell pattern 51 is equal to X3/Y3 and Y3/X3. In general, the set of equations described in table 1 can be used to determine all four aspect ratios for the two grid cell patterns determined from step 114.

TABLE 1

| Grid Cell Aspect Ratio equations | Comments |
|---|---|
| Test_Ratio1 = (Phys_Pg_W/a)/(Phys_Pg_L/b) | Aspect ratio of a grid cell corresponding to a first cell pattern. Sub-page oriented normally. |
| Test_Ratio2 = (Phys_Pg_W/b)/(Phys_Pg_L/a) | Aspect ratio of a grid cell corresponding to a second cell pattern. Sub-page oriented normally. |
| Test_Ratio3 = | Aspect ratio of a grid cell |

TABLE 1-continued

| Grid Cell Aspect Ratio equations | Comments |
|---|---|
| (Phys_Pg_L/a)/(Phys_Pg_W/b) | corresponding to a first cell pattern. Sub-page oriented orthogonally. |
| Test_Ratio4 = (Phys_Pg_L/b)/(Phys_Pg_W/a) | Aspect ratio of a grid cell corresponding to a second grid cell pattern. Sub-page oriented orthogonally. |

Where "Phys_Pg_L" is the printable length of the designated print medium and "Phys_Pg_W" is the printable width of the designated print medium. "Test Ratio" is the test aspect ratio of a grid cell. This step is depicted by box 117.

After all the test aspect ratios are calculated, the two grid cell patterns determined from step 114 are compared by determining the grid cell pattern having a test aspect ratio value closest to the aspect ratio of the first logical page. This particular aspect ratio is referred to herein as the "optimum test aspect ratio" and the corresponding grid cell pattern is referred to herein as the "optimum grid cell pattern". This step is depicted by box 119. To perform this comparison, the following set of equations can be used:

$$\text{Diff\_Ratio1}=\text{abs}(\text{Log\_Pg\_Ratio}-\text{Test\_Ratio1})$$

$$\text{Diff\_Ratio2}=\text{abs}(\text{Log\_Pg\_Ratio}-\text{Test\_Ratio2})$$

$$\text{Diff\_Ratio3}=\text{abs}(\text{Log\_Pg\_Ratio}-\text{Test\_Ratio3})$$

$$\text{Diff\_Ratio4}=\text{abs}(\text{Log\_Pg\_Ratio}-\text{Test\_Ratio4})$$

Where "abs" is the absolute value. Thus the optimum test aspect ratio corresponds to the lowest Diff Ratio value. It can be seen that once the optimum test aspect ratio is known, the optimum grid cell pattern and sub-page orientation are also known for performing N-UP printing.

In a further aspect of the present invention, after the optimum grid cell pattern and orientation of sub-pages are determined, an appropriate scale factor is then calculated for converting the logical pages into sub pages appropriately sized for printing onto the designated print medium. If the sub-pages are to be oriented orthogonally (decision box 121) and if the optimum test aspect ratio is less than the aspect ratio of the first logical page (decision box 123) then the following scale factor is used (as depicted by box 125):

$$\text{Scale\_Factor}=(\text{Cell\_Y\_Dim})/(\text{Log\_Pg\_X})$$

Whereas if the optimum test aspect ratio is not less than the aspect ratio of the first logical page (decision box 123) then the following scale factor is used (as depicted by box 127):

$$\text{Scale\_Factor}=(\text{Cell\_X\_Dim})/(\text{Log\_Pg\_Y})$$

If the sub-pages are to be oriented normally and if the optimum test aspect ratio is less than the aspect ratio of the first aspect ratio (decision box 129) then the following scale factor is used (as depicted by box 131):

$$\text{Scale\_Factor}=(\text{Cell\_X\_Dim})/(\text{Log\_Pg\_X})$$

If the sub-pages are to be oriented normally (decision box 121) and if the test aspect ratio is not less than the logical page aspect ratio (decision box 129) then the following scale factor is used (as depicted by box 133):

$$\text{Scale\_Factor}=(\text{Cell\_Y\_Dim})/(\text{Log\_Pg\_Y})$$

Where "Cell_Y_Dim" is the length of the grid cell along the physical Y-axis of the designated print medium and "Cell_X_Dim" is the length of the grid cell along the physical X-axis of the designated print medium.

After the Scale factor is determined, the optimum grid cell pattern and scale factor is stored in printer memory for later use to perform N-UP printing as depicted by box 135. It is noted that in this embodiment the scale factor determined above is used to scale subsequent logical pages that are substantially the same dimension as the first logical page. If other logical pages within the print job are not substantially the same dimension as the first logical page, these pages are scaled appropriately to fit within a corresponding grid cell.

In a second exemplary embodiment of the present invention, additional division factors are determined resulting in additional grid cell patterns that are to be compared. This is accomplished by determining all whole factors whose product equals the value of N. For example if N=6 the division factors would include a=1 and b=6 in addition to the division factors a=2 and b=3. These additional pairs of division factors are referred to collectively herein as "supplementary division factors". Because the supplementary division factors may produce a grid cell pattern having a test aspect ratio that is closer to the aspect ratio of the first logical page, this second embodiment may result in a sub-page layout pattern that is superior to the layout pattern determined using the method depicted in FIG. 2A and FIG. 2B.

Figure 5:
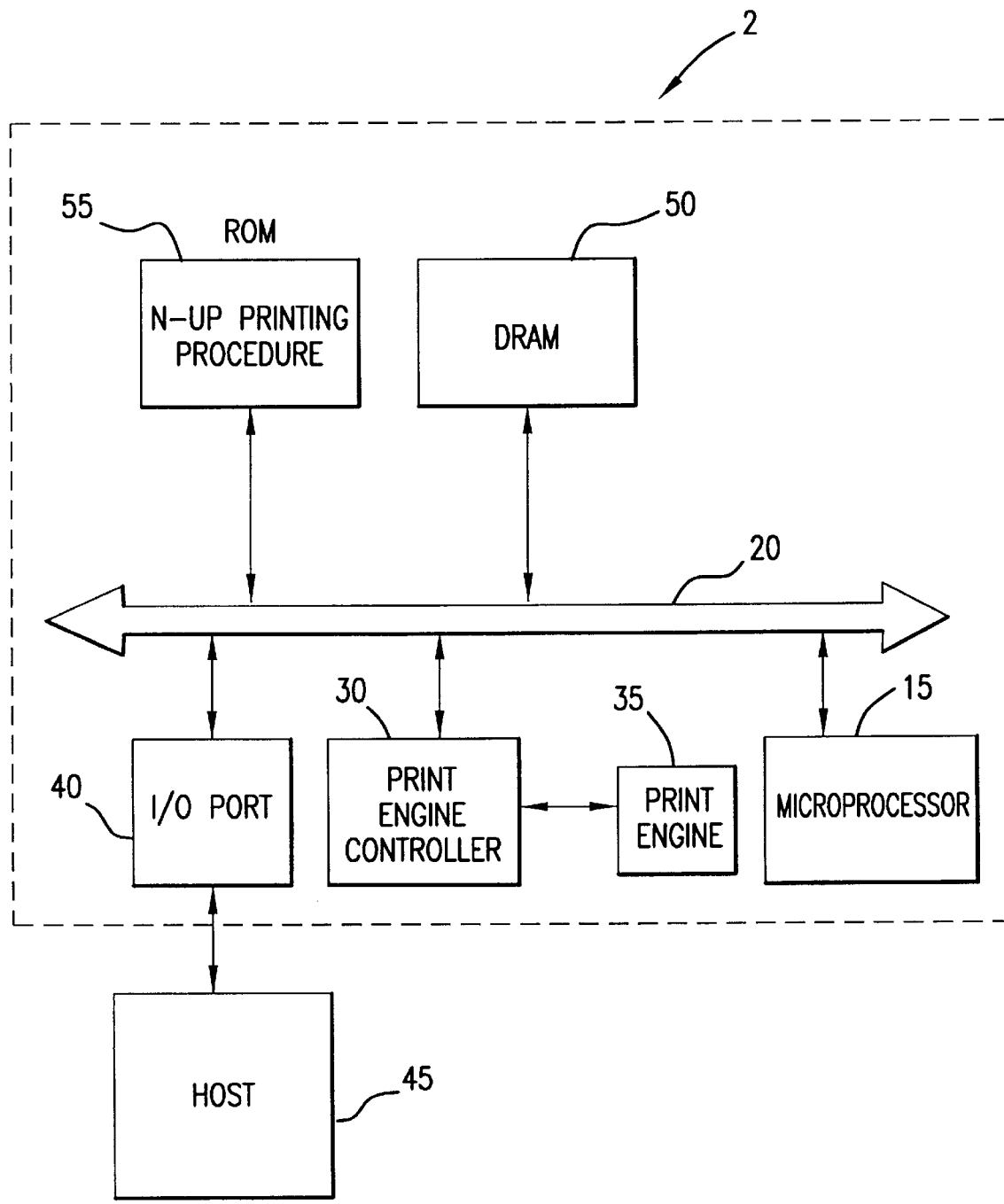
FIG. 5 is a block diagram illustrating apparatus according to the present invention.

FIG. 5 is a high level block diagram of a page printer 10 incorporating yet another embodiment of the present invention in the form of apparatus. Page printer 10 is controlled by a microprocessor 15 which communicates with other elements of the system via bus 20. A print engine controller 30 and associated print engine 35 connect to bus 20 and provide the print output capability for page printer 10.

An input/output (I/O) port 40 provides communication between the page printer 10 and a host computer 45. A dynamic random access memory (DRAM) 50 provides a main memory for page printer 10 for storing and processing a print job received from host 45. A read only memory (ROM) 55 holds firmware which controls the operation of microprocessor 15, printer 10. Importantly, code procedures stored in ROM 55 include a N-UP printing procedure according to the principles described in the first embodiment of the present invention described above.

One benefit of the present invention is improved N-UP printing capability. As mentioned previously, prior methods and apparatus for achieving N-UP printing are limited to a pre-specified number of N values. For example, a typical printer is limited to 2, 4 and 9-UP printing. In addition, prior methods do not determine the optimum layout of sub-pages onto a print medium. The methods and apparatus described above provides N-UP printing that is not limited to a pre-specified number of N values and allows for an optimized arrangement of sub-pages onto a designated print medium.

It should be understood that the forgoing description and examples used herein are only illustrative of the invention. Various alternatives and modifications can be devised by those skilled in the art without departing from the invention. The present invention is intended to embrace all such alternatives, modifications and variances that fall within the scope of the appended claims.

What is claimed is:

1. A method for selecting a grid cell pattern to use for N-Up printing a logical page having a first aspect ratio onto a print medium, the method comprising;

(a) defining a first grid cell pattern of X1×Y1 cells and a second grid cell pattern of X2×Y2 cells;

(b) identifying a test aspect ratio closest in value to the first aspect ratio from the set of test aspect ratios comprising:

(X1/Y1), (Y1/X1), (X2/Y2) and (Y2/X2);

(c) selecting a grid cell pattern to use for N-Up printing from a group of grid cell patterns comprised of the grid cell patterns defined in step (a), based upon the test aspect ratio identified in step (b).

2. The method of claim 1, wherein step (c) includes selecting the first grid cell pattern if the test aspect ratio identified in step (b) is (X1/Y1) or(Y1/X1).

3. The method of claim 2, wherein step (c) further includes selecting the second grid cell pattern if the test aspect ratio identified in step (b) is (X2/Y2) or (Y2/X2).

4. The method of claim 3, further comprising:

(d) determining an optimum sub-page orientation within a cell from the selected grid cell pattern based upon the test aspect ratio identified in step (b);

(e) scaling the logical page so as to create a sub-page that fits, when the sub-page is at the optimum orientation, within a cell from the selected grid cell pattern.

5. The method of claim 4, further comprising:

(f) N-Up printing the logical page by printing the sub-page, at the optimum orientation and in accordance with the selected grid cell pattern, N times onto the print medium.

6. Apparatus for selecting a grid cell pattern to use for N-Up printing a logical page, having a first aspect ratio, onto a print medium, the apparatus comprising;

(a) means for defining a first grid cell pattern of X1×Y1 cells and a second grid cell pattern of X2×Y2 cells;

(b) means for identifying a test aspect ratio closest in value to the first aspect ratio from the set of test aspect ratios comprising:

(X1/Y1), (Y1/X1), (X2/Y2) and (Y2/X2);

(c) means for selecting a grid cell pattern to use for N-Up printing from a group of grid cell patterns comprised of the grid cell patterns defined by the defining means, based upon the test aspect ratio identified by the identifying means.

7. The apparatus of claim 6, wherein the selecting means operates to select the first grid cell pattern if the test aspect ratio identified by the identifying means is (X1/Y1) or (Y1/X1).

8. The apparatus of claim 7, wherein the selecting means further operates to select the second grid cell pattern if the test aspect ratio identified by the identifying means is (X2/Y2) or (Y2/X2).

9. The apparatus of claim 8, further comprising:

(d) means for determining an optimum sub-page orientation within a cell from the selected grid cell pattern based upon the test aspect ratio identified by the identifying means;

(e) means for scaling the logical page so as to create a sub-page that fits, when the sub-page is at the optimum orientation, within a cell from the selected grid pattern.

10. The apparatus of claim 9, further comprising:

(f) means for N-Up printing the logical page by printing the sub-page, at the optimum orientation and in accordance with the selected grid cell pattern, N times onto the print medium.

11. A program storage medium readable by a computer, tangibly embodying a program of instructions executable by the computer to perform method steps for selecting a grid cell pattern to use for N-Up printing a logical page having a first aspect ratio onto a print medium, the method steps comprising;

(a) defining a first grid cell pattern of X1×Y1 cells and a second grid cell pattern of X2×Y2 cells;

(b) identifying a test aspect ratio closest in value to the first aspect ratio from the set of test aspect ratios comprising:

(X1/Y1), (Y1/X1), (X2/Y2) and (Y2/X2);

(c) selecting a grid cell pattern to use for N-Up printing from a group of grid cell patterns comprised of the grid cell patterns defined in step (a), based upon the test aspect ratio identified in step (b).

\* \* \* \* \*